(12) United States Patent
Yamada et al.

(10) Patent No.: US 9,609,261 B2
(45) Date of Patent: Mar. 28, 2017

(54) DISPLAY APPARATUS, DISPLAY SYSTEM, AND DISPLAY METHOD

(75) Inventors: Eiju Yamada, Kanagawa (JP); Yoshinori Ohashi, Tokyo (JP)

(73) Assignee: Sony Corporation (JP)

(*) Notice: Subject to any disclaimer, the term of this patent is extended or adjusted under 35 U.S.C. 154(b) by 284 days.

(21) Appl. No.: 13/572,943

(22) Filed: Aug. 13, 2012

(65) Prior Publication Data

US 2013/0050274 A1 Feb. 28, 2013

(30) Foreign Application Priority Data

Aug. 24, 2011 (JP) ................. 2011-182455

(51) Int. Cl.
| | | |
|---|---|---|
| G06T 3/40 | (2006.01) |
| H04N 5/445 | (2011.01) |
| G09G 5/14 | (2006.01) |
| H04N 21/422 | (2011.01) |
| H04N 21/431 | (2011.01) |
| H04N 21/4402 | (2011.01) |
| H04N 21/443 | (2011.01) |
| H04N 21/475 | (2011.01) |
| H04N 21/482 | (2011.01) |
| G06F 3/14 | (2006.01) |

(52) U.S. Cl.
CPC .......... *H04N 5/44591* (2013.01); *G09G 5/14* (2013.01); *H04N 21/42204* (2013.01); *H04N 21/4316* (2013.01); *H04N 21/4438* (2013.01); *H04N 21/440263* (2013.01); *H04N 21/4751* (2013.01); *H04N 21/482* (2013.01); *G06F 3/1454* (2013.01); *G09G 2340/04* (2013.01); *G09G 2370/20* (2013.01); *H04N 21/4222* (2013.01); *H04N 21/42208* (2013.01); *H04N 21/42224* (2013.01)

(58) Field of Classification Search
None
See application file for complete search history.

(56) References Cited

U.S. PATENT DOCUMENTS

| | | | |
|---|---|---|---|
| 7,458,029 B2 * | 11/2008 | Agrawala et al. ............. 715/744 |
| 8,363,170 B2 * | 1/2013 | Kostepen ...................... 348/837 |
| 2006/0259591 A1 * | 11/2006 | Hashimoto ........... H04L 67/125 709/219 |
| 2006/0284786 A1 * | 12/2006 | Takano et al. ................. 345/1.1 |

(Continued)

FOREIGN PATENT DOCUMENTS

| | | |
|---|---|---|
| CN | 101060597 A | 10/2007 |
| JP | 2001061110 A | 3/2001 |

(Continued)

OTHER PUBLICATIONS

Japanese Office Action for JP 2011-182455 Dated Jan. 26, 2016.

(Continued)

*Primary Examiner* — Andrew G Yang
(74) *Attorney, Agent, or Firm* — Lerner, David, Littenberg, Krumholz & Mentlik, LLP (57) ABSTRACT

There is provided a control apparatus including a command acquiring unit that acquires selection commands of pieces of content transmitted from a plurality of controllers, and a display processing unit that, when at least a part of users who use the plurality of controllers view same content, enlarges a display area of the content.

5 Claims, 7 Drawing Sheets (56) References Cited

U.S. PATENT DOCUMENTS

| | | | |
|---|---|---|---|
| 2007/0250867 A1* | 10/2007 | Kuwabara et al. | 725/75 |
| 2008/0117339 A1* | 5/2008 | Kirsche | H04N 5/4403 |
| | | | 348/734 |
| 2010/0050081 A1 | 2/2010 | Lee et al. | |
| 2010/0095241 A1* | 4/2010 | Nagano et al. | 715/790 |
| 2010/0169791 A1* | 7/2010 | Pering et al. | 715/740 |
| 2011/0191690 A1* | 8/2011 | Zhang et al. | 715/746 |
| 2011/0239142 A1* | 9/2011 | Steeves et al. | 715/764 |

FOREIGN PATENT DOCUMENTS

| | | | |
|---|---|---|---|
| JP | 2001094900 A | 4/2001 |
| JP | 2009-055476 A | 3/2009 |
| JP | 2009164977 A | 7/2009 |

OTHER PUBLICATIONS

Japanese Office Action for Application No. 2011-182455 dated Aug. 9, 2016.
Chinese Office Action for Application No. 2012102950989 dated Sep. 5, 2016.
Japanese Office Action for Application No. 2011-182455 dated Jun. 2, 2015.

* cited by examiner

DISPLAY APPARATUS, DISPLAY SYSTEM, AND DISPLAY METHOD

CROSS-REFERENCE TO RELATED APPLICATION

The present application claims priority from Japanese Patent Application No. JP 2011-182455 filed in the Japanese Patent Office on Aug. 24, 2011, the entire content of which is incorporated herein by reference.

BACKGROUND

The present disclosure relates to a display apparatus, a display system, and a display method.

In the related art, a method of displaying a plurality of screens when a plurality of users desire to view different pieces of content using a display apparatus such as a television receiver (TV) has been known. For example, Japanese Patent Application Publication No. 2009-55476 discloses technology for changing a display size of a screen on a display unit when any one of a plurality of screens is selected and an operation of display processing with respect to the selected screen is input.

SUMMARY

However, when a plurality of videos are displayed on one apparatus such as the television receiver, only a maximum of two kinds of content can be viewed at the same time, in a function according to the related art, such as two-screen viewing or picture in picture.

In the two-screen viewing in which a size of each content display area is the same and the example according to the related art in which the display size can be changed, superiority or inferiority of a viewing environment may not be realized, even when a plurality of users desire to view the same content or there are users having strong authority.

Accordingly, it is desirable to realize superiority or inferiority of a viewing environment, when a plurality of users view pieces of content using a single apparatus.

According to an embodiment of the present disclosure, there is provided a display apparatus which includes a command acquiring unit that acquires selection commands of pieces of content transmitted from a plurality of controllers, and a display processing unit that, when at least a part of users who use the plurality of controllers view same content, enlarges a display area of the content.

According to the embodiments of the present disclosure described above, when a plurality of users view pieces of content using a single apparatus, superiority or inferiority of a viewing environment can be realized.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Outline of Remote Controller System
2. Example of Configuration of System
3. Example of Operation of System
4. Operation Flow of System

[1. Outline of Remote Controller System]

Figure 1:
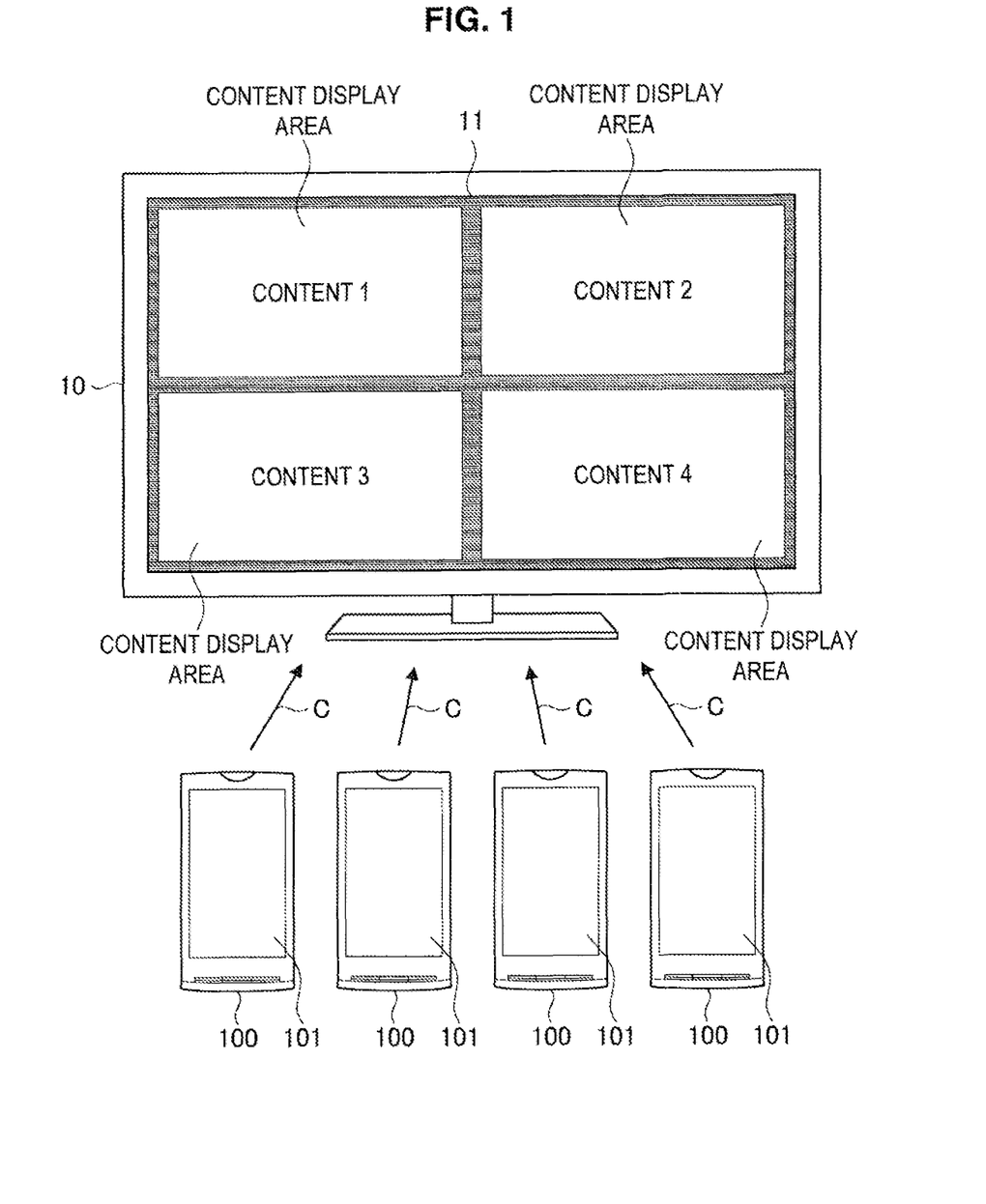
FIG. 1 is a diagram showing a remote controller system including a remote controller according to an embodiment of the present disclosure.

Hereinafter, a system including a remote controller (remote commander (remote operation input apparatus)) 100 and a television 10 according to an embodiment of the present disclosure will be described. However, the present disclosure is not limited to the remote controller 100 and may be applied to a portable information processing apparatus such as portable digital assistants (PDA) and mobile phones mounted with a touch panel display 101.

FIG. 1 is a diagram showing the system including the remote controller 100 according to the embodiment of the present disclosure. As shown in FIG. 1, the system according to this embodiment includes the remote controllers 100 that are mounted with the touch panel displays 101 and the television (control apparatus) 10 that is operated through the remote controllers 100. The television 10 is an example of the control apparatus and is an example of an electronic apparatus that is operated through the remote controllers 100. However, the control apparatus may be another display apparatus having a display function, such as a personal computer (PC). The control apparatus may be an electronic apparatus (set-top box (STB)) that is used in a connection state with a monitor.

In the system according to this embodiment, wired communication or wireless communication is performed at least from the remote controller 100 to the television 10. The communication between the remote controller 100 and the television 10 may be performed directly or may be performed indirectly through a network not shown in the drawings.

The remote controller 100 displays operation icons to operate the television 10 on the touch panel display 101. If an operation input such as icon selection is performed, the remote controller 100 transmits a predetermined operation command C to the television 10, according to the operation input. The television 10 receives the operation command C and executes a predetermined operation according to the operation command C. As a communication method between the remote controller 100 and the television 10, a method using infrared rays (IR), a method using RF and Bluetooth, and a method using an IP network may be used.

As shown in FIG. 1, in the system according to this embodiment, a plurality of users can view the television 10 at the same time, using the remote controllers 100. For this reason, a plurality of content display areas are set to a display 11 of the television 10. The sizes of the content display areas can be changed and a different content is displayed on each content display area. FIG. 1 shows an example of the case in which four users view different content pieces 1 to 4 using the remote controllers 100, respectively. As such, in the system according to this embodiment, each user can view the different content using one television 10. Each user can individually operate the television 10 using the remote controller 100.

[2. Example of Configuration of System]

Figure 2:
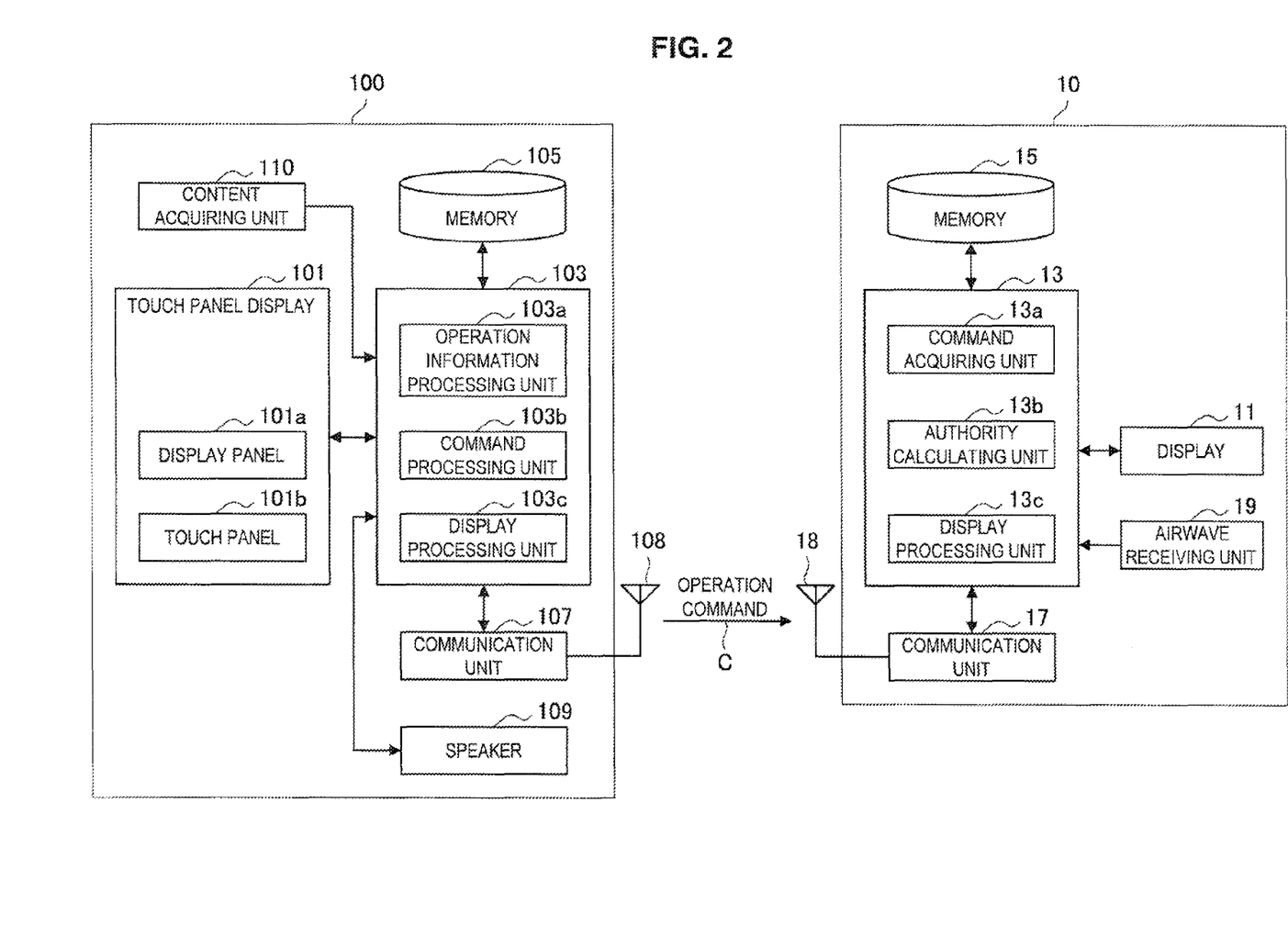
FIG. 2 is a block diagram showing functional configurations of the remote controller and a television.

FIG. 2 shows functional configurations of the remote controller 100 and the television 10. The remote controller 100 includes a touch panel display 101, a control unit 103, a memory 105, a communication unit 107, an antenna 108, a speaker 109, and a content acquiring unit 110. The television 10 includes a display 11, a control unit 13, a memory 15, a communication unit 17, an antenna 18, and an airwave receiving unit 19. FIG. 2 shows only main functional configurations according to the embodiment of the present disclosure.

First, the functional configuration of the remote controller 100 will be described. The touch panel display 101 has a configuration in which a touch panel 101b (detecting unit) is stacked on a display panel 101a. As the display panel 101a, a liquid crystal display (LCD) is used. As the touch panel 101b, panels of a resistive film type, a capacitive type, an ultrasonic type, and an infrared type are used.

The touch panel 101b detects a contact state of a finger with respect to a panel surface. Instead of the contact state or in addition to the contact state, a proximity state of the finger may be detected. The touch panel 101b supplies a contact signal to the control unit 103, when the finger contacts the touch panel 101b, and supplies a release signal to the control unit 103, when the finger is separated from the touch panel 101b.

The touch panel 101b supplies a coordinate signal corresponding to a contact position to the control unit 103, while the finger contacts the touch panel 101b. In this case, the coordinate signal shows X-Y coordinates of the contact position with respect to the touch panel 101b.

The control unit 103 includes a CPU, a RAM, and a ROM. The CPU uses the RAM as a work memory, executes programs stored in the ROM, and controls each unit of the remote controller 100. The control unit 103 functions as an operation information processing unit 103a that acquires operation input information on the touch panel 101b and processes the operation input information, a command processing unit 103b that executes processing relating to a command transmitted to the television 10, and a display processing unit 103b that controls display of the display panel 101a, by the programs.

The memory 105 is a non-volatile memory such as an EEPROM and stores icon data, command information, and information regarding authority of the remote controller 100. The communication unit 107 transmits the predetermined operation command C to the television 10 through the antenna 108, according to an operation input from the user.

The operation information processing unit 103a of the control unit 103 decodes the coordinate signal supplied form the touch panel 101b to generate coordinate data and controls each unit of the remote controller 100, on the basis of the coordinate data and/the contact/release signal. The command processing unit 103b of the control unit 103 supplies command information according to operation input information to the communication unit 107, according to an operation input from the user. At this time, the command processing unit 103b reads the command information according to the operation input information from the memory 105, if necessary. The command information includes information of selection commands to select pieces of content. The command processing unit 103b reads information regarding the authority of the remote controller 100 from the memory 105 and supplies the command information including the information regarding the authority to the communication unit 107. The communication unit 107 transmits the predetermined operation command C to the television 10 through the antenna 108, on the basis of the command information. The operation command C includes the selection commands of the pieces of content that are displayed on the display 11 of the television 10.

The display processing unit 103c of the control unit 103 reads the icon data stored in the memory 105, generates display data of a GUI screen, and supplies the display data to the display panel 101a. The display panel 101a displays the GUI screen, on the basis of the display data.

The content acquiring unit 110 acquires content from the network such as the Internet. The speaker 109 outputs a sound.

Next, the functional configuration of the television 10 will be described. The display 111 displays operation screens and pieces of content. The content includes content displayed by a common television, such as movies, news, and variety programs received by the airwave receiving unit 19. The control unit 13 includes a CPU, a RAM, and a ROM and controls each unit of the television 10. The CPU uses the RAM as a work memory, executes programs stored in the ROM, and controls each unit of the television 10. The control unit 13 functions as a command processing unit 13a that executes processing for acquiring the operation command C received from the remote controller 100, an authority calculating unit 13b that calculates the authority regarding a content display area, on the basis of the operation command C, and a display processing unit 13c that executes display processing on the display 11, by the programs. The display processing unit 13c executes processing for changing a size of the content display area, according to the authority. The memory 15 is a non-volatile memory such as an EEPROM and stores operation screen information and operation command information.

The communication unit 17 receives the operation command C from the remote controller 100, through the antenna 18. The communication unit 17 can transmit the operation screen information and the operation command information corresponding to the television 10 and status information showing a status of the television 10 to the remote controller 100, in addition to the reception of the operation command C. The communication unit 17 transmits information regarding the content to the remote controller 100 to display the content displayed on the display 11 on the display panel 101a of the remote controller 100.

If the command processing unit 13a of the control unit 13 acquires the operation command C from the remote controller 100, the command processing unit 13a controls each unit of the television 11 to execute processing corresponding to the operation command C, on the basis of the command information.

[3. Example of Operation of System]

Figure 3:
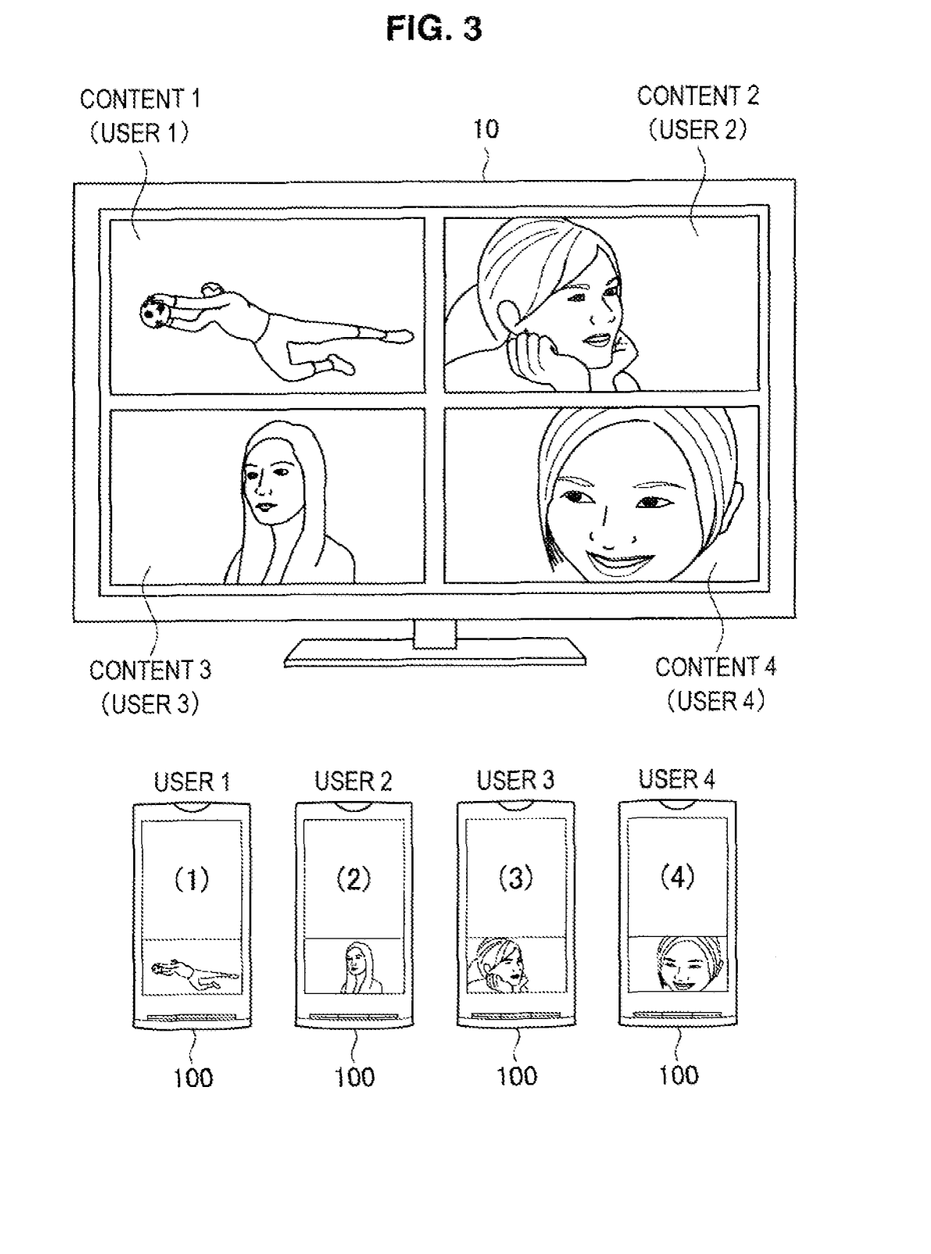
FIG. 3 is a schematic view showing an aspect in which four users operate the television using the remote controllers.
Figure 4:
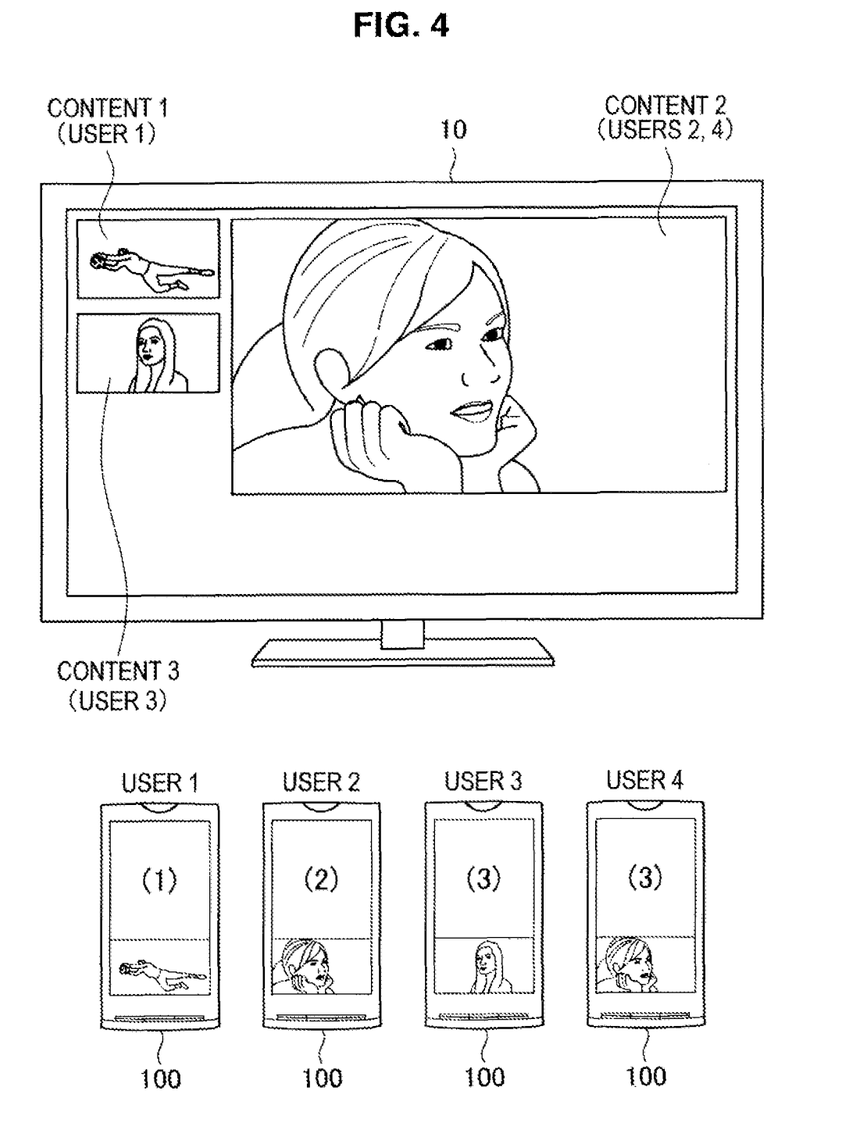
FIG. 4 is a schematic view showing a state in which a user 2 and a user 4 view the same content 2.
Figure 5:
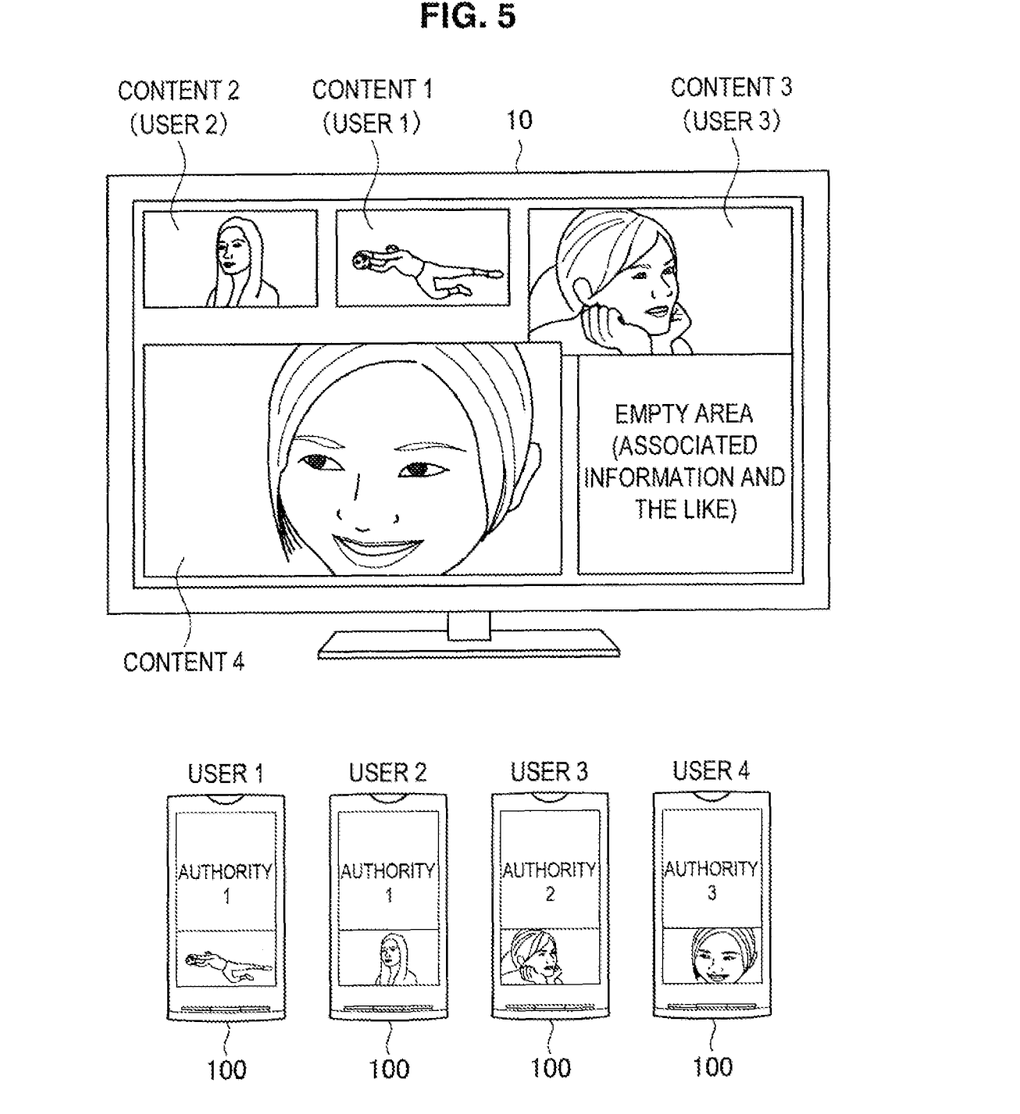
FIG. 5 is a schematic view showing an example of the case in which associated information corresponding to a content having the strongest authority is displayed on an empty area of a display.

Next, an operation of the system according to this embodiment will be described. FIGS. 3 to 5 are schematic views showing the operation of the system according to this embodiment. FIG. 3 is a schematic view showing an aspect in which four users view different pieces of content in one television 10 using the different remote controllers 100, respectively. Specifically, FIG. 3 shows a state in which four users 1 to 4 view different content pieces 1 to 4, respectively, and view the television 10 with the same authority. Although described in detail below, as shown in FIG. 3, when the authorities of the users are the same, the display 11 is divided into four parts and the four content pieces 1 to 4 which the users view are displayed on the display 11, with the same sizes.

FIG. 4 shows a state in which the user 1 views the content 1 and the user 3 views the content 3, similar to the case of FIG. 3, but the users 2 and 4 view the same content. In this case, because the content 2 is viewed by the two users, the content display areas of the two users are integrated and the content is displayed on an enlarged display area. Meanwhile, the display areas of the content pieces 1 and 3 each of which is viewed by only one user are reduced. Therefore, if the content 2 is compared with the content pieces 1 and 3 each viewed by only one user, the content 2 is displayed bigger. As such, in this embodiment, because the sizes of the display screens are determined according to the authorities regarding the pieces of content, the authority regarding the content having the large number of viewers (ratings) becomes strong and the display area on the display 11 is set bigger. Therefore, the content having the large number of viewers can be displayed in a wider range, according to the authority.

FIG. 5 is a schematic view showing an example of the case in which the users use the remote controllers 100 having the different authorities, respectively. In this case, a display area of a content that is selected by the user who uses the remote controller 100 having the strong authority is enlarged. In the example of FIG. 5, the users 1 to 4 view the content pieces 1 to 4, respectively. However, because the authority of the remote controller 100 used by the user 4 is "3" to be a maximum value, the display area of the content 4 that is viewed by the user 4 becomes biggest. Because the authority of the remote controller 100 used by the user 3 is "2", the display area of the content 3 that is viewed by the user 3 becomes smaller than the display area of the content 4. Because the authorities of the remote controllers 100 used by the users 1 and 2 are "1", the display areas of the content pieces 1 and 2 that are viewed by the users 1 and 2 become smallest.

In this case, when the two users who use the remote controllers 100 having the authorities "1" view the same content, the content display areas of the two users are integrated and the authorities are added and become "2 (=1+1)". Therefore, the integrated content display area of the two users becomes a content display area that has the same size as the content display area of the user who uses the remote controller 100 having the authority "2".

If the sizes of the content display areas are changed, an empty area not used for the display of all the pieces of content may be generated in the display 11 of the television 10. In this case, associated information of the content which the user is viewing may be displayed on the empty area. In the example shown in FIG. 5, the display area of the content 4 that is viewed by the user 4 having the strongest authority is displayed biggest and associated information corresponding to the content 4 having the strongest authority is displayed on the empty area generated in the display 11. As such, when the content sizes are changed, if an empty space is generated in the display 11, the associated information and the detailed information regarding the content can be displayed.

Figure 6:
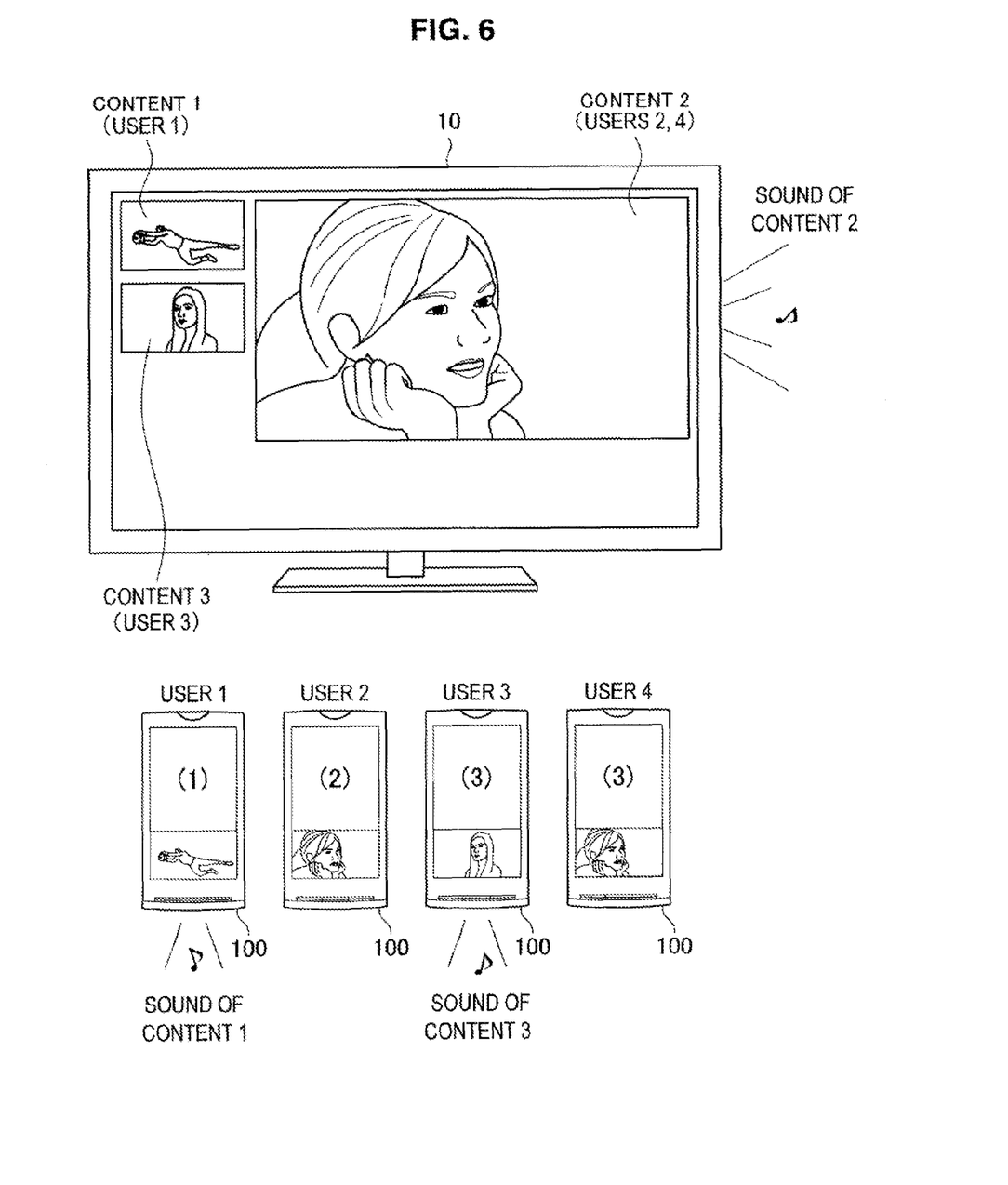
FIG. 6 is a schematic view showing an example of the case in which a sound of a content 2 to be displayed biggest is reproduced from the television and sounds of the other content pieces 1 and 3 are reproduced from the remote controller.

When a plurality of pieces of content are displayed on the content display areas, a sound of the content of the content display area having the strongest authority may be reproduced from the television 10. In addition, sounds of the other pieces of content may be reproduced from the remote controller 100. FIG. 6 is a schematic view showing an example of the case in which a sound of the content 2 having the strongest authority and displayed biggest is reproduced from the television 10 and sounds of the other content pieces 1 and 3 are reproduced from the remote controllers 100 of the users 1 and 3 viewing the content pieces 1 and 3. Thereby, the user who views the content having the strong authority can directly hear the sound reproduced from the television 10 and the users who view the pieces of content having the weak authorities can surely hear the sounds of the viewing pieces of content from the remote controllers 100. In this case, only the sound of the content having the strongest authority is reproduced from the television 10, the sounds of the other pieces of content are transmitted to the remote controllers 100 through the communication unit 17, and the sounds of the other pieces of content are output from the speakers 109 of the remote controllers 100.

When each user operates the remote controller 100 and plays a game on the display 11, the authority may be determined using superiority or inferiority such as a score of each user and the size of the content display area may be changed.

When the remote controller 100 is a mobile apparatus such as a smart phone, each remote controller 100 can acquire pieces of content from the network such as the Internet, using the content acquiring unit 110. In this case, each user can transmit the content acquired by each remote controller 100 from the remote controller 100 to the television 10, display the content on the display 11, and view the content. Even in this case, similar to the example described above, the size of the content display area can be changed according to the authority. Each user transmits video and sound data from each remote controller 100 to the television 10, displays the corresponding content on a screen of the television 10, and views the content. The control unit 103 of the remote controller 100 transmits data of the content acquired by the content acquiring unit 110 to the television 10. The control unit 13 of the television 10 displays the content received from the remote controller 100 on the display 11, with a size according to the authority of the remote controller 100.

The remote controllers 100 are not limited to existing in the same family. For example, the remote controllers 100 may exist in different families. In this case, each user does not share the television 10. However, when each user uses an application such as a video phone or an on-line game, the display area can be changed according to the authority, similar to the case described above.

[4. Operation Flow of System]

Figure 7:
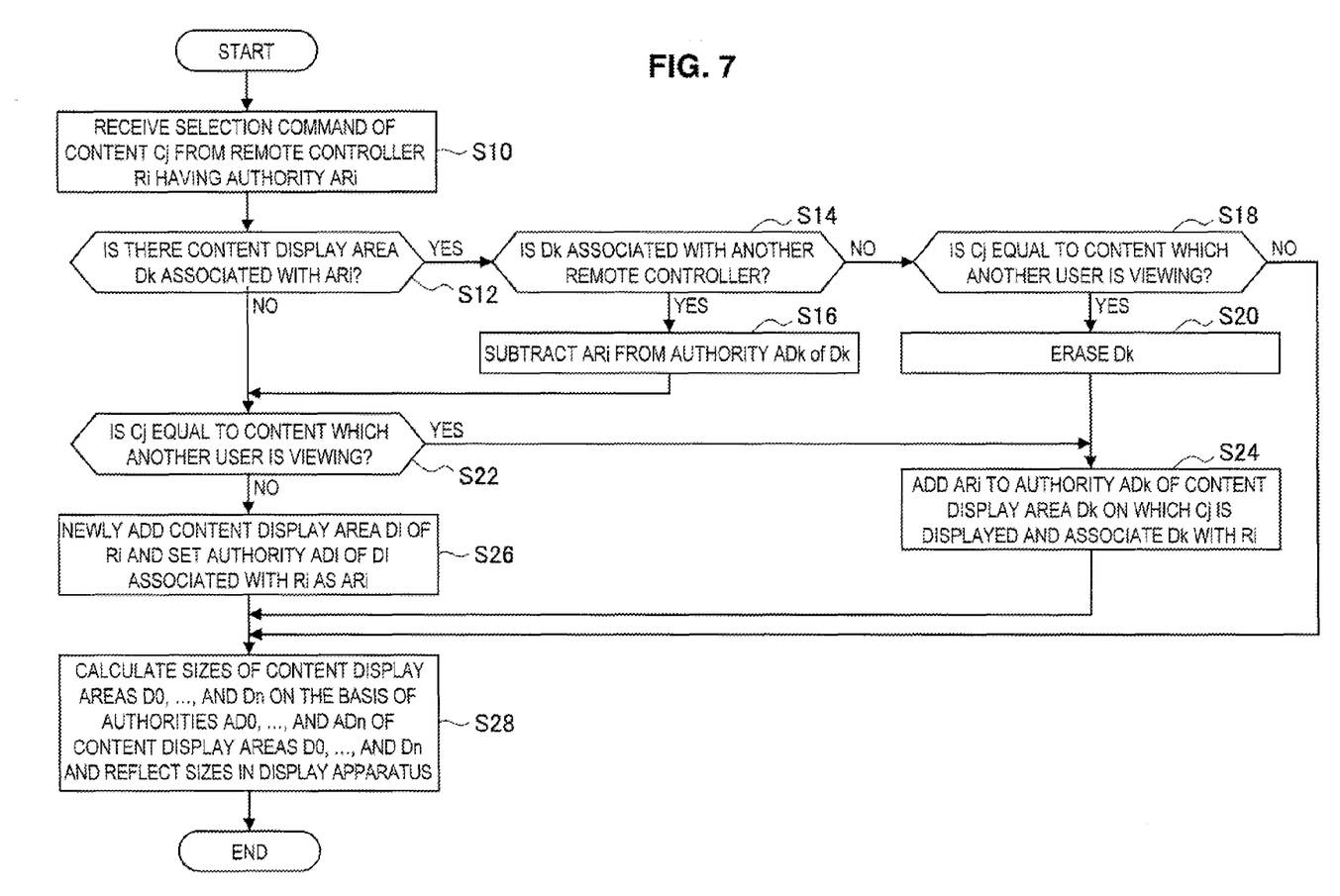
FIG. 7 is a flowchart illustrating processing of a system according to the embodiment.

Next, processing of the system according to this embodiment will be described on the basis of FIG. 7. FIG. 7 is a flowchart illustrating the processing of the system according to this embodiment. Referring to FIG. 7, in step S10, if a selection command of a content Cj is newly received from a remote controller Ri having authority ARi, in steps S14 to S20, when there is a content associated with the remote controller Ri, processing for removing the authority ARi from the content (or processing for removing the content) is executed. In steps S22 to S26, the authority ARi of the remote controller Ri is added to the newly selected content Cj and the content is displayed with a size according to the authority.

Specifically, first, in step S10, the selection command of the content Cj is received from the remote controller Ri having the authority ARi. Next, in step S12, it is determined whether there is a content display area Dk associated with the authority ARi of the remote controller Ri.

When it is determined in step S12 that there is the content display area Dk associated with the authority ARi, the process proceeds to step S14. In step S14, it is determined whether the content display area Dk is associated with another remote controller 100. When it is determined that the content display area Dk is associated with another remote controller 100, the process proceeds to step S16. The authority ARi is subtracted from authority ADk of the content display area Dk. Thereby, the content Cj is newly selected with respect to the content display area Dk associated with the remote controller Ri and the authority ARi is subtracted from the authority of the content display area Dk.

Meanwhile, when it is determined in step S14 that the content display area Dk is not associated with another remote controller 100, the process proceeds to step S18. In step S18, it is determined whether the content Cj is equal to the content which another user is viewing. When it is determined that the content Cj is equal to the content which another user is viewing, the process proceeds to step S20 and the associated content display area Dk is erased. After step S20, the process proceeds to step S24.

When it is determined in step S12 that there is no content display area Dk associated with the authority ARi or after the processing of step S16 is executed, the process proceeds to step S22. In step S22, it is determined whether the newly selected content Cj is equal to the content which another user is viewing. When it is determined in step S22 that the content Cj is equal to the content which another user is viewing, the process proceeds to step S24.

In step S24, the authority ARi of the remote controller Ri is added to the authority ADk of the content display area Dk on which the newly selected content Cj is displayed and the content display area Dk is associated with the remote controller Ri.

When it is determined in step S22 that the content Cj is not equal to the content which another user is viewing, the process proceeds to step S26. In step S26, a content display area Dl of the remote controller Ri is newly added and the content display area Dl is associated with the remote controller Ri. The authority ADl of the content display area Dl is set as the authority ARi of the remote controller Ri.

After steps S24 and S26, the process proceeds to step S28. In step S28, sizes of content display areas D0, . . . , and Dn are calculated on the basis of authorities AD0, . . . , and ADn of the content display areas D0, . . . , and Dn and are reflected in the display 11 of the display apparatus (television 10). In this case, when the authorities AD0, . . . , and ADn become strong, the sizes of the content display areas D0, . . . , and Dn increase. After step S28, the processing ends.

As described above, according to this embodiment, the plurality of pieces of content viewed by the individual users can be displayed on one television 10 and the individual users can select the pieces of content using the remote controllers 100. When the sizes of the pieces of content are changed and the authority of the content having the large number of viewers is strong, the display area is enlarged.

Therefore, the sizes of the pieces of content can be changed according to the authorities and the plurality of users can view the pieces of content in an optimal situation.

Thereby, a user interface in which the plurality of users can share one display apparatus (television 10) and enjoy viewing the pieces of content can be provided. When the plurality user sharing the display apparatus desire to view the same content or there are the users who have the different authorities, superiority or inferiority of a viewing environment can be optimally realized.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A control apparatus including:
a command acquiring unit that acquires selection commands of pieces of content transmitted from a plurality of controllers; and
a display processing unit that, when at least a part of users who use the plurality of controllers view same content, enlarges a display area of the content.

(2) The control apparatus according to (1), further including:
an authority calculating unit that calculates authorities regarding the pieces of content selected by the selection commands,
wherein the display processing unit changes the display areas of the pieces of content based on the calculated authorities.

(3) The control apparatus according to (2),
wherein the display processing unit enlarges the display areas of the pieces of content with increase in values of the calculated authorities.

(4) The control apparatus according to (2),
wherein values of the authorities increase with increase in the number of controllers selecting the pieces of content.

(5) The control apparatus according to (2),
wherein the authorities are determined according to the plurality of controllers.

(6) A display system including:
controllers; and
a control apparatus that is operated remotely by the controllers,
wherein the control apparatus includes a command acquiring unit that acquires selection commands of pieces of content transmitted from the plurality of controllers and a display processing unit that, when at least a part of users who use the plurality of controllers view same content, enlarges a display area of the content.

(7) A display method including:
transmitting, by a plurality of controllers, selection commands of pieces of content;
acquiring, by a control apparatus, the selection commands transmitted from the plurality of controllers; and
enlarging, by the control apparatus, when at least a part of users who use the plurality of controllers view same content, a display area of the content.

What is claimed is:
1. A control apparatus comprising:
a command acquiring unit configured to acquire selection commands of pieces of content transmitted from a plurality of controllers or users, in which each controller or user has a respective controller authority value associated therewith;

a display processing unit to control a size of each of a plurality of display areas on a display device each having different content simultaneously displayed thereon based on overall authority values; and an authority calculating unit to calculate an overall authority value for each display area having respective content displayed thereon based on a number of controllers or users which selected the respective content and the respective controller authority value or values associated therewith, for use by the display processing unit, in which when multiple controllers or users select a same content and at least two of the multiple controllers or users each have a different controller authority value, the authority calculating unit is configured to calculate a respective overall authority value for the respective display area by adding together the respective controller authority value for each controller or user which selected the same content, such that when both a first controller having a controller authority value of 2 and a second controller having a controller authority value of 1 select the same content the calculated overall authority value for the respective display area would be 3, and in which the display processing unit is configured to control the size of each of the plurality of display areas based on the overall authority values so that respective display areas having the same overall authority values have same size display areas regardless of whether a number of controllers or users of each of the respective display areas is the same, such that a first display area obtained when 3 controllers or users select a same first content each having a respective controller authority value of 1 for a respective overall authority value of 3 is the same size as a second display area obtained when 1 controller or user selects a second content which has a respective controller authority value of 3 for a respective overall authority value of 3.

2. The control apparatus according to claim 1, wherein the display processing unit enlarges the display areas of the pieces of content with increase in values of calculated overall authority values.

3. A display system comprising:
a plurality of controllers; and
a control apparatus operable remotely by the controllers or users, in which each controller or user has a respective controller authority value associated therewith,
the control apparatus including a command acquiring unit configured to acquire selection commands of pieces of content transmitted from the plurality of controllers, a display processing unit to control a size of each of a plurality of display areas on a display device each having different content simultaneously displayed thereon based on overall authority values, and an authority calculating unit to calculate an overall authority value for each display area having respective content displayed thereon based on a number of controllers or users which selected the respective content and the respective controller authority value or values associated therewith for use by the display processing unit, in which when multiple controllers or users select a same content and at least two of the multiple controllers or users each have a different controller authority value, the authority calculating unit is configured to calculate a respective overall authority value for the respective display area by adding together the respective controller authority value for each controller or user which selected the same content, such that when both a first controller having a controller authority value of 2 and a second controller having a controller authority value of 1 select the same content the calculated overall authority value for the respective display area would be 3, and in which the display processing unit is configured to control the size of each of the plurality of display areas based on the overall authority values so that respective display areas having the same overall authority values have same size display areas regardless of whether a number of controllers or users of each of the respective display areas is the same, such that a first display area obtained when 3 controllers or users select a same first content each having a respective controller authority value of 1 for a respective overall authority value of 3 is the same size as a second display area obtained when 1 controller or user selects a second content which has a respective controller authority value of 3 for a respective overall authority value of 3.

4. A display method comprising:
transmitting, by a plurality of controllers, selection commands of pieces of content;
acquiring selection commands of pieces of content transmitted from the plurality of controllers;
controlling a size of each of a plurality of display areas on a display device each having different content simultaneously displayed thereon based on overall authority values; and
calculating an overall authority value for each display area having respective content displayed thereon based on a number of controllers or users which selected the respective content and respective controller authority value or values associated therewith for use in the size controlling, in which when multiple controllers or users select a same content and at least two of the multiple controllers or users each have a different controller authority value, a respective overall authority value for the respective display area is calculated by adding together the respective controller authority value for each controller or user which selected the same content, such that when both a first controller having a controller authority value of 2 and a second controller having a controller authority value of 1 select the same content the calculated overall authority value for the respective display area would be 3, and in which the controlling includes controlling the size of each of the plurality of display areas based on the overall authority values so that respective display areas having the same overall authority values have same size display areas regardless of whether a number of controllers or users of each of the respective display areas is the same, such that a first display area obtained when 3 controllers or users select a same first content each having a respective controller authority value of 1 for a respective overall authority value of 3 is the same size as a second display area obtained when 1 controller or user selects a second content which has a respective controller authority value of 3 for a respective overall authority value of 3.

5. A control apparatus for use in a system having a display device and a plurality of control devices for use by a number of users, said apparatus comprising:
a memory configured to have a predetermined program stored therein; and a central processing unit (CPU) configured to execute the predetermined program stored in the memory, during operation, when executing the predetermined program the CPU is configured to (i) acquire a number of selection commands of pieces of content transmitted from more than one of the plurality of control devices, each control device or user having a respective controller authority value associated therewith, (ii) control a size of more than one display area on the display device based on overall authority values, each said display area configured to have content different from each other displayed simultaneously thereon, and (iii) calculate an overall authority value for each said display area having respective content displayed thereon based on a number of control devices or users which selected the respective content and the respective controller authority value or values associated therewith, and in which when multiple control devices or users select a same content and at least two of the multiple control devices or users each have a different controller authority value, the CPU when executing the predetermined program during operation is configured to calculate a respective overall authority value for the respective display area by adding together the respective controller authority value for each control device or user which selected the same content, such that when both a first control device having a controller authority value of 2 and a second control device having a controller authority value of 1 select the same content the calculated overall authority value for the respective display area would be 3, and in which the CPU when executing the predetermined program during operation is configured to control the size of each of the plurality of display areas based on the overall authority values so that respective display areas having the same overall authority values have same size display areas regardless of whether a number of control devices or users of each of the respective display areas is the same, such that a first display area obtained when 3 control devices or users select a same first content each having a respective controller authority value of 1 for a respective overall authority value of 3 is the same size as a second display area obtained when 1 control device or user selects a second content which has a respective controller authority value of 3 for a respective overall authority value of 3.

* * * * *